United States Patent
Salo et al.

(10) Patent No.: US 7,721,104 B2
(45) Date of Patent: May 18, 2010

(54) SYSTEM, METHOD AND COMPUTER PROGRAM PRODUCT FOR DOWNLOADING PUSHED CONTENT

(75) Inventors: Juha H. Salo, Littoinen (FI); Janne La. Aaltonen, Turku (FI); Guido Cugi, Helsinki (FI)

(73) Assignee: Nokia Corporation, Espoo (FI)

( * ) Notice: Subject to any disclaimer, the term of this patent is extended or adjusted under 35 U.S.C. 154(b) by 1625 days.

(21) Appl. No.: 10/689,396

(22) Filed: Oct. 20, 2003

(65) Prior Publication Data

US 2005/0083929 A1 Apr. 21, 2005

(51) Int. Cl.
*H04L 29/06* (2006.01)
*G06F 11/30* (2006.01)

(52) U.S. Cl. .................... 713/176; 713/191

(58) Field of Classification Search .......... 713/201, 713/176, 191
See application file for complete search history.

(56) References Cited

U.S. PATENT DOCUMENTS

| | | | |
|---|---|---|---|
| 6,119,167 A * | 9/2000 | Boyle et al. ............... 709/234 |
| 6,123,737 A * | 9/2000 | Sadowsky ................. 717/173 |
| 6,223,291 B1 * | 4/2001 | Puhl et al. ................. 726/28 |
| 6,535,855 B1 * | 3/2003 | Cahill et al. ................ 705/1 |
| 6,658,247 B1 | 12/2003 | Saito |
| 6,725,377 B1 * | 4/2004 | Kouznetsov ............... 726/23 |
| 6,807,558 B1 * | 10/2004 | Hassett et al. ............. 709/203 |
| 7,010,578 B1 * | 3/2006 | Lewin et al. .............. 709/217 |
| 7,080,030 B2 * | 7/2006 | Eglen et al. ................. 705/26 |
| 7,111,057 B1 * | 9/2006 | Sherman et al. ........... 709/223 |
| 7,143,337 B2 * | 11/2006 | Landsman et al. ......... 715/500 |
| 7,308,487 B1 * | 12/2007 | Dansie et al. .............. 709/219 |

(Continued)

FOREIGN PATENT DOCUMENTS

EP 1 130 459 A2 9/2001

(Continued)

OTHER PUBLICATIONS

*3rd Generation Partnership Project; Technical Specification Group Services and System Aspects: Multimedia Broadcast/Multicast Service; Stage 1 (Release 6)—Technical Specification*; 3GPP TS 22.146; Mar. 2003; 17 pages; V6.2.0; 3rd Generation Partnership Project (3GPP™).

(Continued)

*Primary Examiner*—Techane J Gergiso
(74) *Attorney, Agent, or Firm*—Alston & Bird LLP

(57) ABSTRACT

A system is provided for downloading pushed content includes a terminal capable of receiving service loading content that identifies download content and has a digital signature. The terminal is capable of authenticating the service loading content based upon the digital signature, and if the service loading content is authenticated, pulling the download content to the terminal. In this regard, the terminal is capable of authenticating the service loading content, and pulling the download content, in response to receiving the service loading content and independent of interaction from a user of the terminal. The terminal can also be capable of determining if an interruption occurs in receiving the download content such that the terminal receives less than the entire download content. And if an interruption occurs, the terminal can be capable of recovering the download content such that the terminal receives the plurality of data packets.

32 Claims, 6 Drawing Sheets

U.S. PATENT DOCUMENTS

| | | | |
|---|---|---|---|
| 7,346,168 B2 * | 3/2008 | Chou et al. | 380/270 |
| 7,457,956 B2 * | 11/2008 | Gehrmann | 713/171 |
| 7,603,703 B2 | 10/2009 | Craft et al. | |
| 2002/0021809 A1 | 2/2002 | Salo et al. | |
| 2002/0023264 A1 | 2/2002 | Aaltonen et al. | |
| 2002/0069406 A1 | 6/2002 | Aaltonen et al. | |
| 2002/0087997 A1 | 7/2002 | Dahlstrom | |
| 2002/0116472 A1 * | 8/2002 | Kalish et al. | 709/218 |
| 2002/0131395 A1 * | 9/2002 | Wang | 370/349 |
| 2002/0160805 A1 | 10/2002 | Laitinen et al. | |
| 2003/0035409 A1 * | 2/2003 | Wang et al. | 370/349 |
| 2003/0065895 A1 * | 4/2003 | Heng et al. | 711/154 |
| 2003/0079030 A1 * | 4/2003 | Cocotis et al. | 709/229 |
| 2003/0084177 A1 | 5/2003 | Mulligan | |
| 2003/0090998 A1 * | 5/2003 | Lee et al. | 370/229 |
| 2003/0092376 A1 * | 5/2003 | Syed | 455/3.06 |
| 2003/0095540 A1 | 5/2003 | Mulligan et al. | |
| 2003/0104801 A1 | 6/2003 | Klulakiotis et al. | |
| 2003/0134653 A1 | 7/2003 | Sarkkinen et al. | |
| 2003/0145229 A1 * | 7/2003 | Cohen et al. | 713/201 |
| 2003/0147369 A1 * | 8/2003 | Singh et al. | 370/338 |
| 2003/0163551 A1 * | 8/2003 | Riordan | 709/219 |
| 2003/0174645 A1 | 9/2003 | Paratainen et al. | |
| 2003/0177379 A1 * | 9/2003 | Hori et al. | 713/193 |
| 2004/0003266 A1 * | 1/2004 | Moshir et al. | 713/191 |
| 2004/0024688 A1 * | 2/2004 | Bi et al. | 705/37 |
| 2004/0068665 A1 * | 4/2004 | Fox et al. | 713/201 |
| 2004/0098592 A1 * | 5/2004 | Taki | 713/176 |
| 2004/0123159 A1 * | 6/2004 | Kerstens et al. | 713/202 |
| 2004/0148400 A1 * | 7/2004 | Mostafa | 709/227 |
| 2004/0176080 A1 * | 9/2004 | Chakravorty et al. | 455/414.1 |
| 2004/0181604 A1 * | 9/2004 | Immonen | 709/232 |
| 2004/0193721 A1 | 9/2004 | Takayama et al. | |
| 2004/0218609 A1 * | 11/2004 | Foster et al. | 370/401 |
| 2004/0248561 A1 * | 12/2004 | Nykanen et al. | 455/414.2 |
| 2004/0267912 A1 * | 12/2004 | Kim | 709/220 |
| 2005/0076208 A1 * | 4/2005 | Hori et al. | 713/165 |
| 2005/0108539 A1 * | 5/2005 | Skog et al. | 713/176 |
| 2006/0020716 A1 * | 1/2006 | Suryanarayana | 709/248 |

FOREIGN PATENT DOCUMENTS

| | | | |
|---|---|---|---|
| EP | 1176490 A2 | 1/2002 |
| EP | 1303099 A2 | 4/2003 |
| EP | 1303102 A2 | 4/2003 |
| EP | 1303102 A3 | 4/2003 |
| WO | WO 01/45319 A1 | 6/2001 |
| WO | WO 01/91365 | 11/2001 |
| WO | WO 02/19067 A2 | 3/2002 |
| WO | WO 03/001755 A1 | 1/2003 |

OTHER PUBLICATIONS

Wireless Application Protocol—WAP-250-PushArchOverview-20010703-a; *WAP Push Architectural Overview*; Jul. 2001; 24 pages; Version 03; Wireless Application Protocol Forum, Ltd.; available at <http://www.wapforum.org/>.

Wireless Application Protocol Architecture Specification—WAP-210-WAPArch-20010712; *WAP Architecture*; Jul. 2001; 24 pages; Version 12; Wireless Application Protocol Forum Ltd.; available at <http://www.wapforum.org/>.

Wireless Application Protocol—WAP-168-ServiceLoad-20010731-a; *Service Loading*; Jul. 2001; 18 pages; Version 31; Wireless Application Protocol Forum, Ltd.; available at <http://www.wapforum.org/>.

Open Mobile Alliance—OMA-Download-OTA-v1_0-20021219-C; *Generic Content Download Over the Air Specification—Version 1.0*; Dec. 2002; 40 pages; Version 19; Open Mobile Alliance, Ltd.; available at <http://www.openmobilealliance.org/>.

Open Mobile Alliance—OMA-Download-OTA-v1_0-20030221-C; *Generic Content Download Over the Air*; Feb. 2003; 40 pages; Candidate Version 1.0; Open Mobile alliance Ltd.

*Promoting Web-Enabled eBusiness—Authentication Architectures, Technologies, and Commerical Implementations*; Technical White Paper Series—e FORCE; 8 pages; available at <http://www.eforceglobal.com>.

*Token Authentication—A Briefing Note*; 3 pages; Aconite—Technical Forum; available at <http://www.aconite.net/technology+forum/token+authentication.htm> (visited Sep. 30, 2003).

Office Action issued in corresponding Japanese Application No. 2006-536247.

* cited by examiner

SYSTEM, METHOD AND COMPUTER PROGRAM PRODUCT FOR DOWNLOADING PUSHED CONTENT

FIELD OF THE INVENTION

The present invention generally relates to systems and methods of downloading content and, more particularly, to systems, methods and computer program products for token-based downloading of content.

BACKGROUND OF THE INVENTION

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. The proliferation of local, regional, and global networks such as the Internet has availed a sea of information to society. These networking technologies have expanded to increasingly include wireless and mobile technologies. Through these networks, information can be downloaded to desktop systems, wireless systems, mobile systems, etc. For example, information available via the Internet can now be downloaded onto mobile wireless units, such as cellular telephones, personal digital assistants (PDAs), laptop computers, etc. One such technology facilitating the transfer of Internet content to and from wireless devices is the Wireless Application Protocol (WAP), which integrates the Internet and other networks with wireless network platforms. Generally, WAP is a set of protocols that accounts for characteristics and functionality of both Internet standards and standards for wireless services. It is independent of wireless network standards, and is designed as an open standard. WAP bridges the gap between the wireline Internet paradigm and the wireless domain, to allow wireless device users to enjoy the benefits of the Internet across both platforms.

Second generation wireless service, often referred to as 2G wireless service, is a current wireless service based on circuit-switched technology. In this regard, 2G systems, such as Global System for Mobile communications (GSM) and Personal Communications Services (PCS), use digital radio technology for improved quality and a broader range of services over first generation mobile technologies. Third generation wireless service, often referred to as 3G wireless service, refers to a set of digital technologies that promises improvements in capacity, speed and efficiency by deploying new packet-based transmission methodologies between terminals and the network. Users of 3G devices and networks will have access to multimedia services such as video-on-demand, video conferencing, fast web access and file transfer. Existing and future services are, and will continue to be, provided by network service operators who make services and applications available to mobile device users via the network.

One particular service feature currently available for communicating information is a "push" feature (also known as a "notification" feature or "alert" feature). In a typical client/server model, a client requests a service or information from a server, which then responds in transmitting information to the client. This is generally referred to as "pull" technology, where the client pulls the information from the server. For example, entry of a Uniform Resource Locator (URL) at a client device which is then dispatched to the server to retrieve the associated information is a pull transaction.

In contrast, "push" technology generally refers to a means to transmit information to one or more devices without a previous user action. Thus, there is no explicit request from the client before the server transmits its information, and therefore push technology essentially includes server-initiated transactions. Push technologies can be used in connection with various protocols and communication technologies. For example, some representative push technologies include Short Message Service (SMS), Wireless Application Protocol (WAP) Push, Multimedia Messaging Service (MMS), Session Initiation Protocol (SIP), as well as others.

In accordance with the WAP push architecture, for example, content delivery is triggered by a push initiator (server), which sends a push message to the client to thereby notify the client of an incoming transmission. Based on the parameters in the push message, then, the client may start the downloading process to thereby download content from the push initiator. More particularly, after a download session has been established between a client and push initiator, a service indication can be delivered to the client, where the contents of the service indication may be presented to the user of the client (e.g. "Incoming advertisement, want to receive?"). Based upon the service indication presented to the user, then, the user can either to accept or decline the service. If the service is accepted, the content can be downloaded from the push initiator to the client. For more information on the WAP push architecture, see, for example, Wireless Application Protocol Forum, *WAP Push Architecture Overview*, WAP-250-PushArchOverview-20010703-a, the contents of which are incorporated herein by reference in its entirety.

Whereas traditional push technologies are adequate to push content to clients, such technologies suffer from drawbacks. In this regard, conventional push technologies, such as that provided by the WAP push architecture, require client (or user of the client) interaction to effectuate the download of content from the push initiator to the client (i.e., end-user needs to accept the pushed content before the content delivery). And for various services and content, it is desirable to push content to clients without requiring an end-user to explicitly accept the content at the download time.

As a solution to the drawback of requiring end-user interaction to receive pushed content, service loading technologies, such as that defined by WAP, can be utilized by a client to download content without end-user interaction. In accordance with WAP, service loading allows clients to receive content without user intervention. In this regard, a push initiator pushes service loading content to a client, which upon receipt of the service loading content, automatically downloads (i.e., "pulls"), from an origin server, content identified by the service loading content. For more information on the WAP service loading architecture, see, for example, Wireless Application Protocol Forum, *Service Loading*, WAP-168-ServiceLoad-20010731-a, the contents of which are incorporated herein by reference in its entirety.

Although service loading technologies solve the drawback of requiring end-user interaction to receive content, such technologies also have drawbacks. In this regard, subscribed/non-subscribed push type services (e.g., e-mail) are prone to spamming. As well known, spamming generally refers to the receipt of unsolicited services, such as bulk email. Thus, it would be desirable to develop a system and method of pushing content to a client without end-user interaction, while reducing the likelihood of receiving unsolicited services or content.

As is well known, many current techniques for downloading content over the air assume, at least to some extent, that such content is downloaded in one communication, or download, session. For example, current Open Mobile Alliance (OMA) techniques for downloading content in accordance with the Over the Air (OTA) protocol assume, at least to some extent, that such content is downloaded in one download session. However, if the client is downloading large content, the time to download the content typically increases, thus increasing the probability that the client will encounter some type of error or interruption in transmission during the download process. For example, end users can interrupt the transmission of downloaded content if such end users desire to utilize the client for an alternative purpose, such as to operate an application other than that receiving the content. Also, for example, an unexpected event, such as client error (e.g., dead battery, halt, crash, etc.) or network failure (e.g., out of the geographic coverage area, etc.) can interrupt the transmission of download content.

Conventionally, when content is downloaded in a single download session, if an error or interruption in transmission occurs during the download process, the client must restart the download process to completely download the content. For example, if a client encounters an error or other interruption in downloading content having a size of thirty-two megabytes over a General Packet Radio Services (GPRS) network, the client typically must restart the download to receive the content, even if the client had already downloaded significant portion of the content before the error or interruption. Several techniques, such as File Transfer Protocol (FTP) techniques, have been developed to recover a download session that has encountered an error or interruption. Such techniques, however, are merely designed to recover a download session that has encountered a network connection error (e.g., modem failure) and do not permit the recovery of download sessions that are halted for other reasons. Thus, it would be desirable to develop a system and method that is capable of not only pushing content to a client without end-user interaction and while reducing the likelihood of receiving unsolicited services or content, but is additionally or alternatively capable of recovering a download session that has encountered a client error, as well as a network error. It would also be desirable for such a system and method to be capable of providing fast authentication of a user desiring to receive content and justify that user has right to that content or service. In addition, it would be desirable for such a system to be capable of facilitating a user receiving paid content without having to repay for the content in the event a download session of such content encounters an error.

SUMMARY OF THE INVENTION

In light of the foregoing background, embodiments of the present invention provide an improved system, method and computer program product for downloading pushed content. The system, method and computer program product of embodiments of the present invention are capable of pushing content to a terminal without end-user interaction, while reducing the likelihood of the terminal receiving unsolicited content. In this regard, in accordance with embodiments of the present invention, the system, method and computer program product are capable of authenticating one or more of a push initiator, an origin server and content pushed to the terminal from the origin server, such as in accordance with a token-based authentication technique. Advantageously, the system, method and computer program product can be capable of authenticating the push initiator, origin server and/or content before the content is pushed to the terminal, typically from an origin server in accordance with a service loading technique. By pushing content to the terminal in accordance with a service loading technique, the content can be pushed to the terminal without end-user interaction. And by requiring the terminal to authenticate the push initiator, origin server and/or content, the system, method and computer program product can be capable of reducing the likelihood of the terminal receiving unsolicited (i.e., unauthorized) content.

In addition to being capable of pushing content to the terminal without user interaction, while reducing the likelihood of receiving unsolicited content, the system, method and computer program product of embodiments of the present invention can be capable of recovering a download session that has encountered a terminal error, as well as a network error. In this regard, received portions of download content can be stored in a non-volatile cache along with a download descriptor, information packets or the like that indicate the amount of download content and status of the download content. Thus, upon interruption of download of the content, the download descriptor and/or information packets can be utilized to determine the remaining portion of the content to complete download of the content such that the remaining portion can be downloaded.

According to one aspect of the present invention, a system is provided for downloading pushed content. The system includes a terminal capable of receiving service loading content that identifies download content and has a digital signature. The terminal is capable of authenticating the service loading content based upon the digital signature, and if the service loading content is authenticated, pulling the download content to the terminal. For example, the terminal can be capable of verifying the digital signature with a public key to thereby authenticate the service loading content. In this regard, the system can also include a push initiator capable of digitally signing the service loading content with a private key associated with the public key, and thereafter transmitting the service loading content to the terminal. Irrespective of how the terminal authenticates the service loading content, however, the terminal is capable of authenticating the service loading content, and pulling the download content, in response to receiving the service loading content and independent of interaction from a user of the terminal.

In addition to the download content, the service loading content can identify an origin server associated with the download content. Thus, the system can also include the identified origin server. In such instances, the terminal can be capable of pulling the download content by sending a request for the download content to the origin server when the service loading content is authenticated, and thereafter receiving the download content from the origin server in response to the request. More particularly, the terminal can be capable of receiving a download descriptor, and then the download content. Also, the download content can comprise a plurality of data packets. In this regard, the terminal can be capable of determining if an interruption occurs in receiving the plurality of data packets such that the terminal receives less than the plurality of data packets of the download content. And if an interruption occurs in receiving the plurality of data packets, the terminal can be capable of recovering the download content such that the terminal receives the plurality of data packets without having to retransmit the data packets that had been successfully transmitted prior to the interruption. The terminal can further be capable of determining at least one remaining data packet to be received at the terminal to thereby complete reception of the plurality of data packets of the download content. The terminal can then instruct the origin server to send the at least one remaining data packet, and thereafter receive the at least one remaining data packet such that the terminal receives the plurality of data packets.

When the download content comprises a plurality of data packets, the terminal can be capable of receiving the plurality of data packets and receiving one or more information packets regarding one or more groups of one or more data packets. In such instances, the terminal can be capable of monitoring the received data packets to determine, based upon at least one information packet, if an interruption occurs in receiving the plurality of data packets such that the terminal receives less than the plurality of data packets of the download content. Then, if an interruption occurs in receiving the plurality of data packets, the terminal can be capable of recovering the download content such that the terminal receives the plurality of data packets without having to retransmit the data packets that had been successfully transmitted prior to the interruption.

According to other aspects of the present invention, a method and computer program product are provided for downloading pushed content. Therefore, embodiments of the present invention provide an improved system, method and computer program product for downloading pushed content. In contrast to conventional techniques for pushing content to a terminal, the system, method and computer program product of embodiments of the present invention are capable of pushing content to a terminal without end-user interaction. Also in contrast to conventional techniques, the system, method and computer program product of embodiments of the present invention are capable of pushing content to a terminal while reducing the likelihood of the terminal receiving unsolicited content, such as spamming content. And further in contrast to conventional techniques for downloading pushed content, the system, method and computer program product of embodiments of the present invention can be capable of recovering a download session that has encountered a terminal error, as well as a network error. Therefore, the terminal and associated system and method of embodiments of the present invention solve the problems identified by prior techniques and provide additional advantages.

BRIEF DESCRIPTION OF THE DRAWINGS

Figure 1:
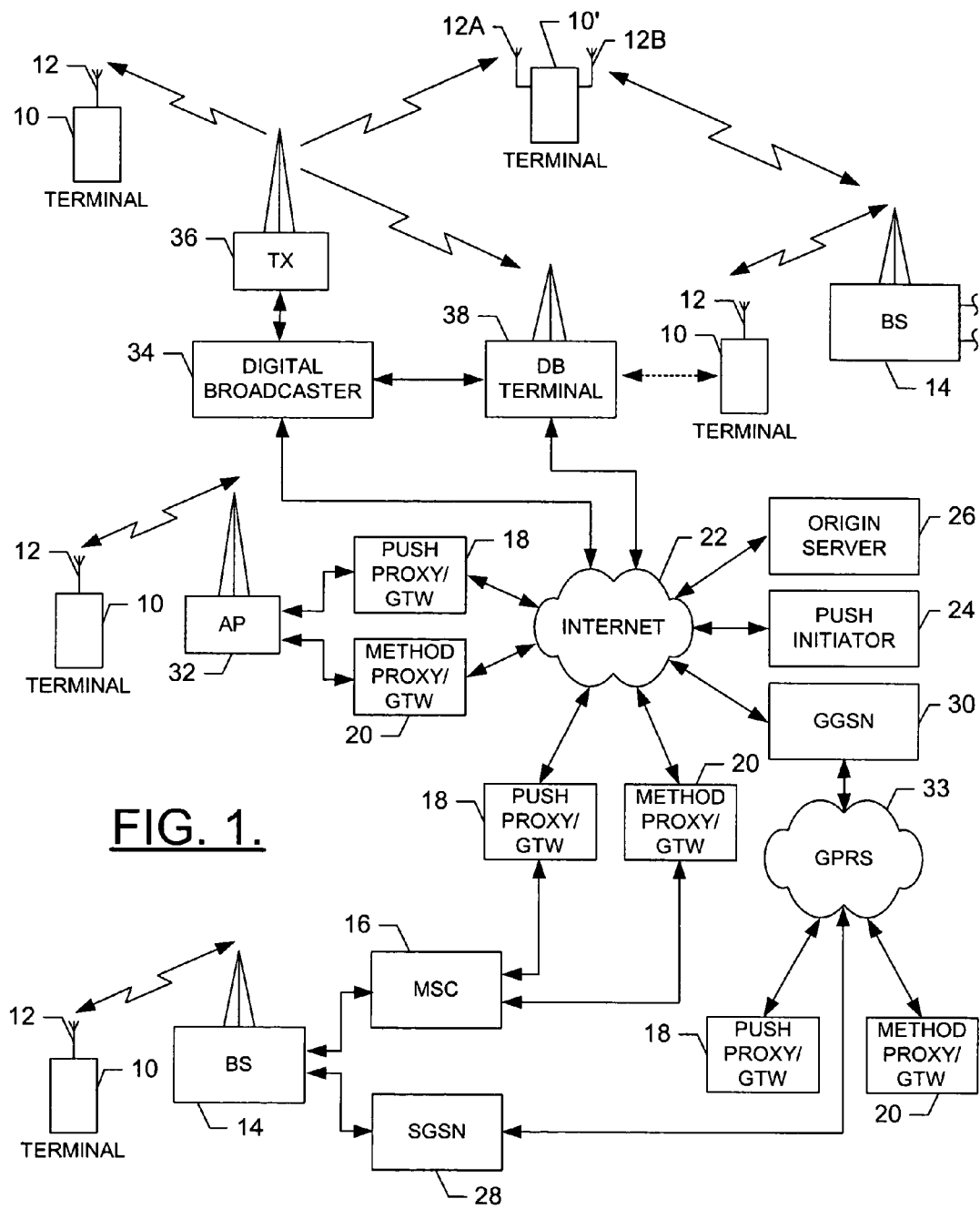
Figure 2:
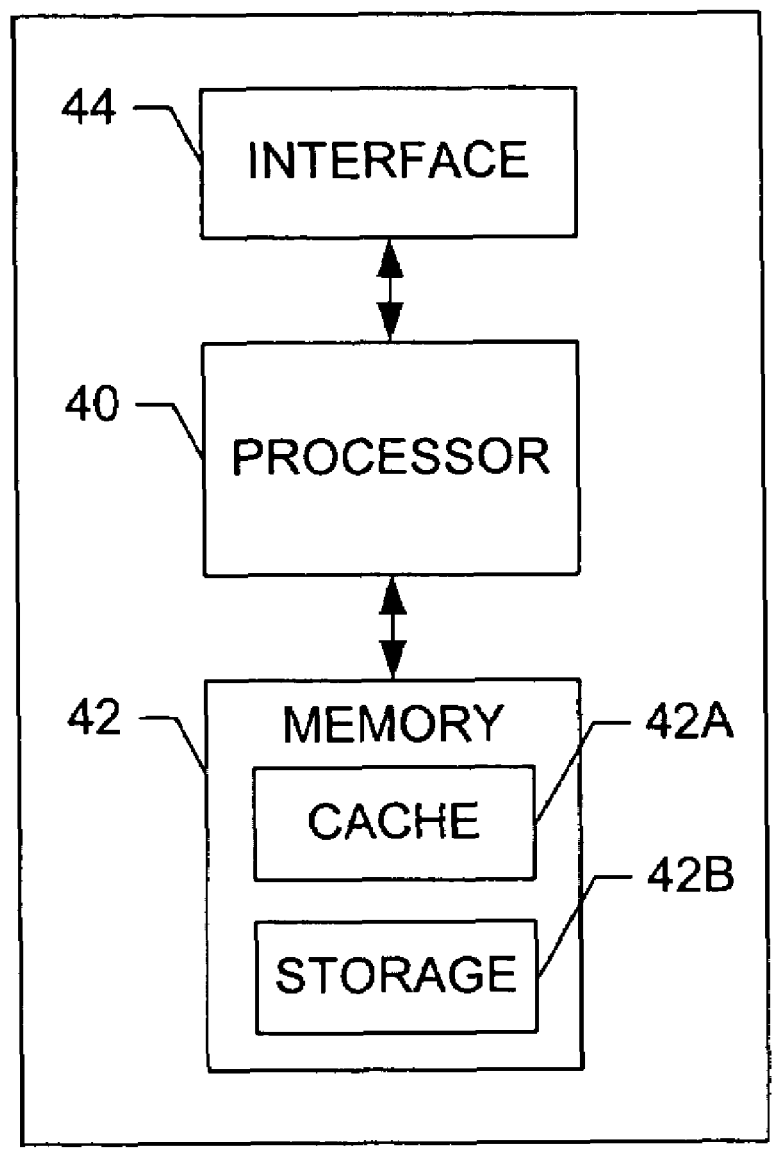
Figure 3:
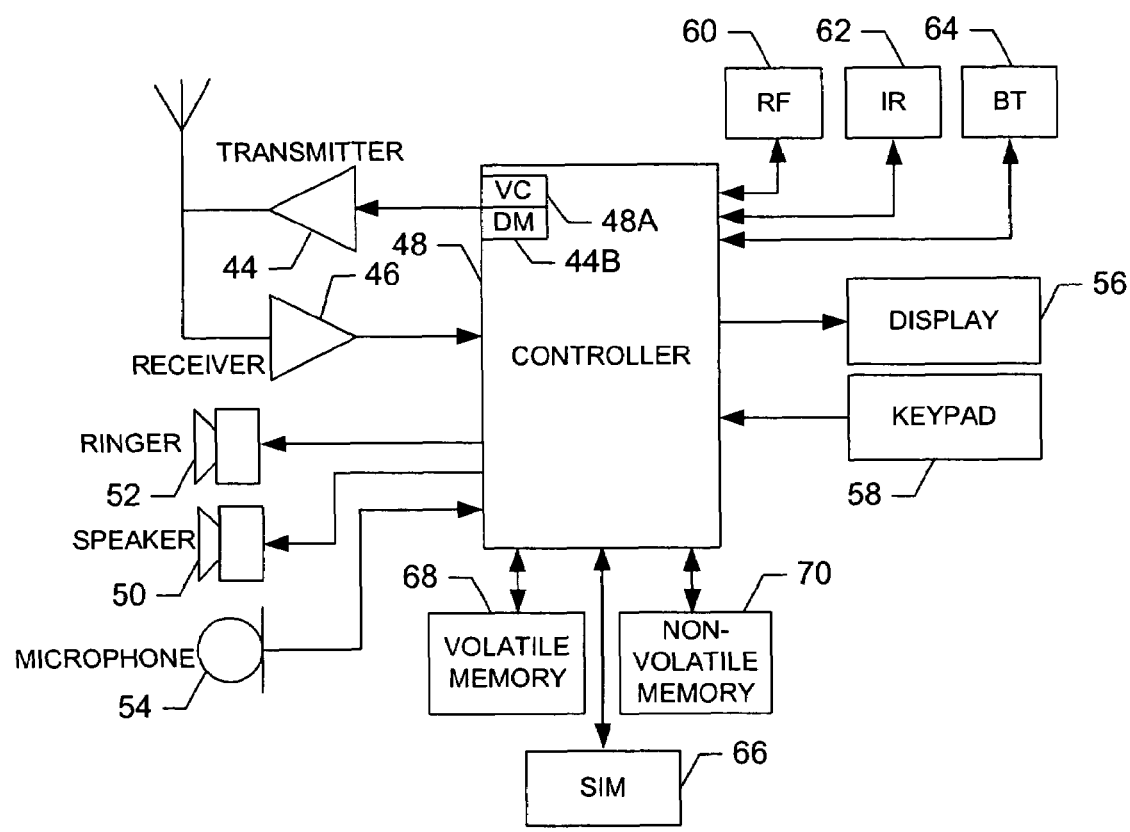
Figure 4:
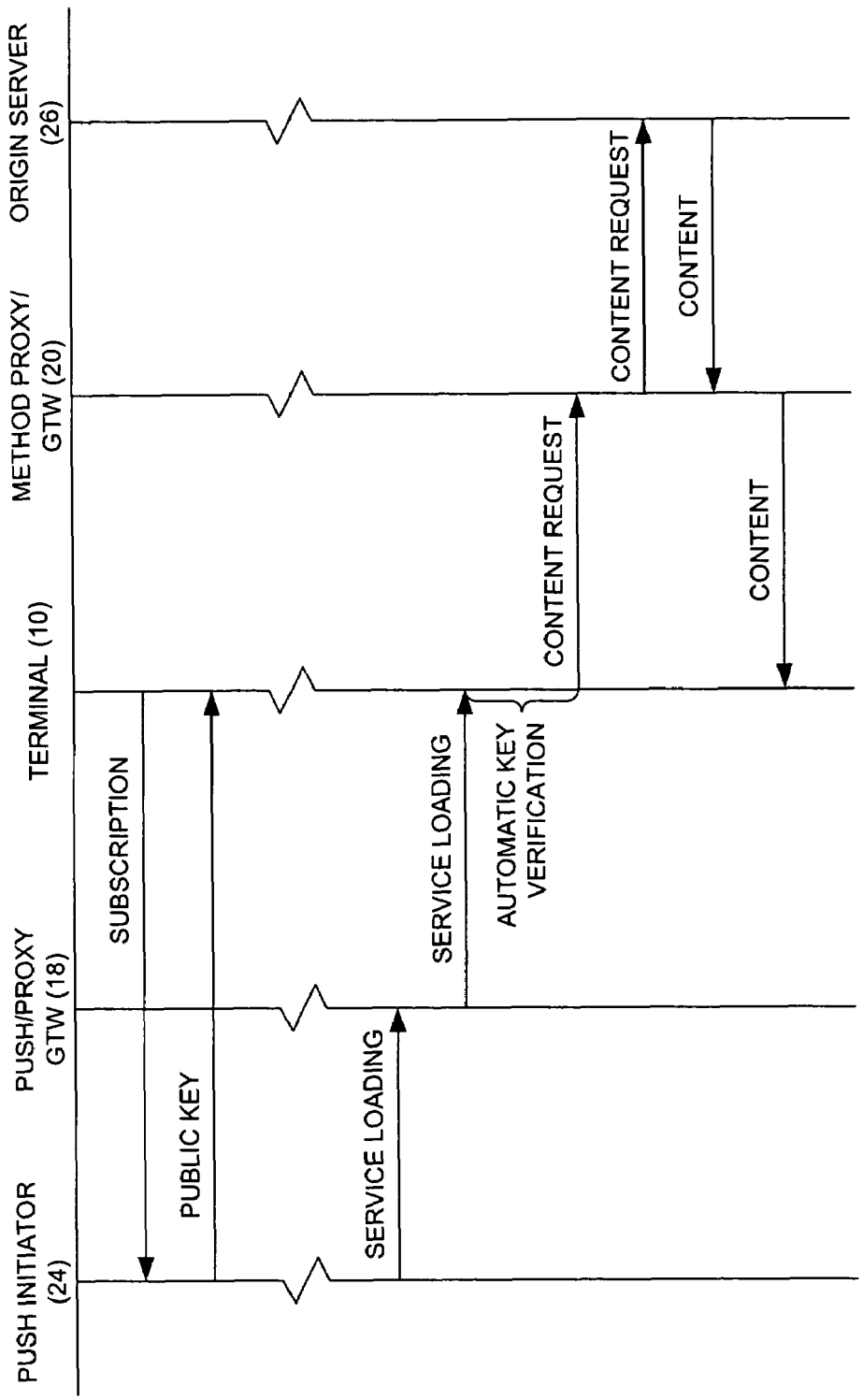
Figure 5:
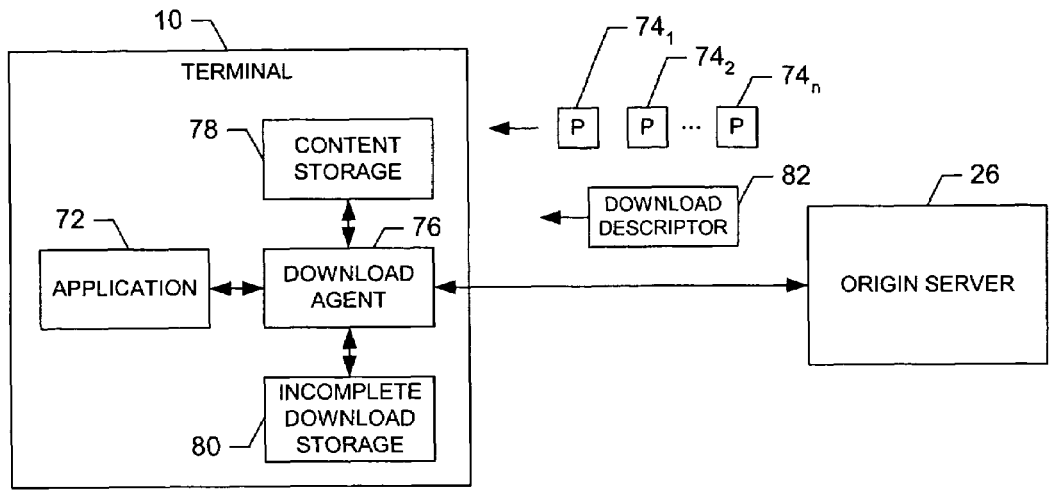
Figure 7:
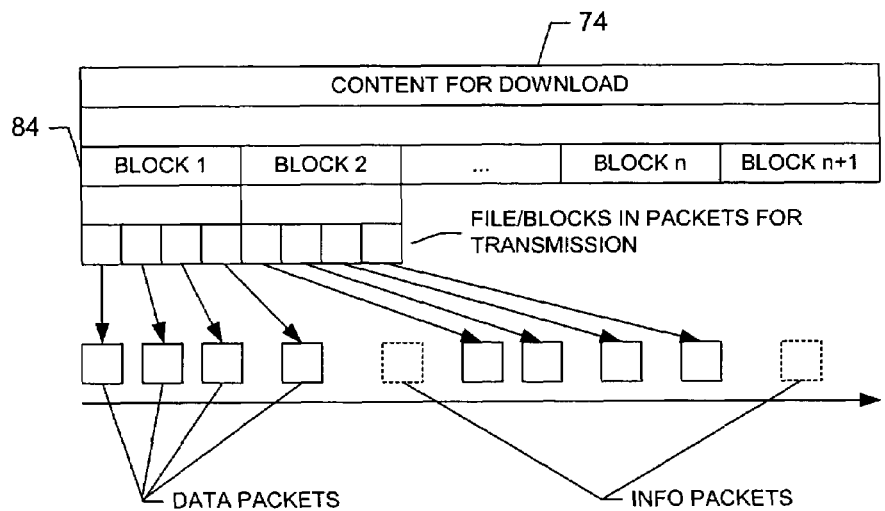
Figure 6:
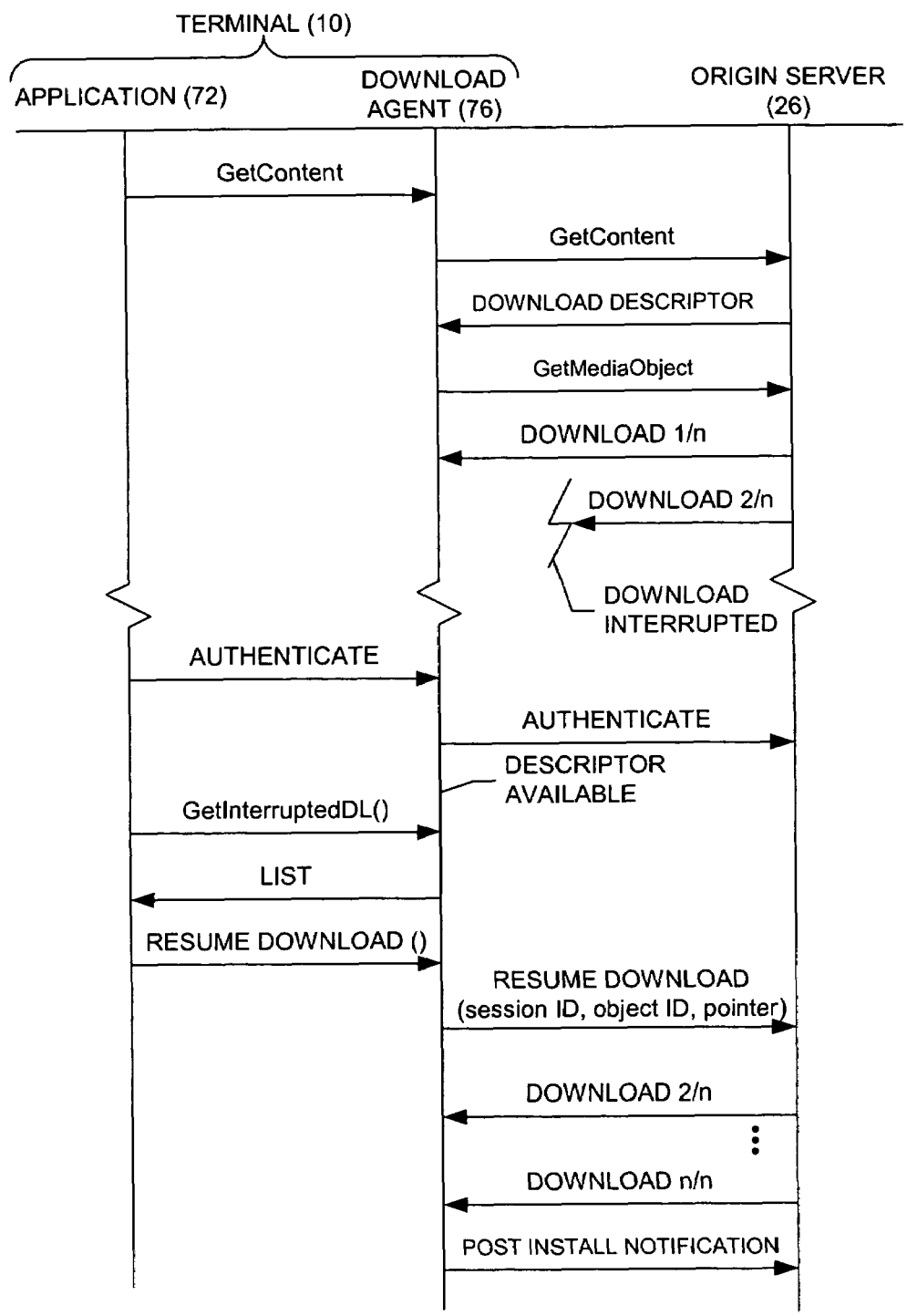

Having thus described the invention in general terms, reference will now be made to the accompanying drawings, which are not necessarily drawn to scale, and wherein:

FIG. 1 is a schematic block diagram of a wireless communications system according to one embodiment of the present invention including a cellular network and a data network to which a terminal is bi-directionally coupled through wireless RF links;

FIG. 2 is a schematic block diagram of an entity capable of operating as a terminal, push proxy/GTW, method proxy/GTW, push initiator and/or origin server, in accordance with embodiments of the present invention;

FIG. 3 is a schematic block diagram of a mobile station that may operate as a terminal, according to embodiments of the present invention;

FIG. 4 is a control flow diagram of elements of a system operating in accordance with a method for downloading pushed content, in accordance with embodiments of the present invention;

FIG. 5 is a functional block diagram of a terminal downloading content from an origin server;

FIG. 6 is a control flow diagram of elements of a system operating in accordance with a method for recovering an interrupted download session, in accordance with embodiments of the present invention; and FIG. 7 illustrates download content broken down into a number of groups or blocks of one or more data packets with one or more information packets added to the packet stream, in accordance with embodiments of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Referring to FIG. 1, an illustration of one type of terminal and system that would benefit from the present invention is provided. The system, terminal and method of the present invention will be primarily described in conjunction with mobile communications applications. It should be understood, however, that the system and method of the present invention can be utilized in conjunction with a variety of other applications, both in the mobile communications industries and outside of the mobile communications industries. For example, the system and method of the present invention can be utilized in conjunction with wireline and/or wireless network (e.g., Internet) applications.

As shown, a terminal 10 can include an antenna 12 for transmitting signals to and for receiving signals from a base site or base station (BS) 14. The base station is a part of a cellular network that includes elements required to operate the network, such as a mobile switching center (MSC) 16. As well known to those skilled in the art, the cellular network may also be referred to as a Base Station/MSC/Interworking function (BMI). In operation, the MSC is capable of routing calls and messages to and from the terminal when the terminal is making and receiving calls. The MSC also provides a connection to landline trunks when the terminal is involved in a call. The MSC can be coupled to a server gateway (GTW), such as a Wireless Application Protocol (WAP) GTW. The WAP gateway can, in turn, include one or more gateways, such as a push proxy/GTW 18 and a method proxy/GTW 20.

The MSC 16 can be coupled to a data network, such as a local area network (LAN), a metropolitan area network (MAN), and/or a wide area network (WAN). The MSC can be coupled to the data network directly and/or indirectly via the WAN GTW (e.g., via push proxy/GTW 18 and/or method proxy/GTW 20). In one typical embodiment, for example, the MSC is coupled to the WAN GTW, and the GTW is coupled to a WAN, such as the Internet 22. In turn, devices such as processing elements (e.g., personal computers, server computers or the like) can be coupled to the terminal 10 via the Internet. For example, as explained below, the processing elements can include one or more processing elements associated with a push initiator 24, as well as one or more processing elements associated with one or more origin servers 26, one of each being illustrated in FIG. 1.

In addition to the MSC 16, the BS 14 can be coupled to a signaling GPRS (General Packet Radio Service) support node (SGSN) 28. As known to those skilled in the art, the SGSN is typically capable of performing functions similar to the MSC 16 for packet switched services. The SGSN, like the MSC, can be coupled to a data network, such as the Internet 22. The SGSN can be directly coupled to the data network. In a more typical embodiment, however, the SGSN is coupled to a packet-switched core network, such as a GPRS core network 33. The packet-switched core network is then coupled to another GTW, such as a GTW GPRS support node (GGSN) 30, and the GGSN is coupled to the Internet. In addition to the GGSN, the packet-switched core network can also be coupled to a WAN GTW (e.g., push proxy/GTW 18 and/or method proxy/GTW 20).

By coupling the SGSN 28 to the GPRS core network 33 and the GGSN 30, devices such as origin servers 26 can be coupled to the terminal 10 via the Internet 22, SGSN and GGSN. In this regard, devices such as origin servers can communicate with the terminal across the SGSN, GPRS and GGSN. For example, origin servers can provide content to the terminal, such as in accordance with the Multimedia Broadcast Multicast Service (MBMS). For more information on the MBMS, see Third Generation Partnership Project (3GPP) technical specification 3GPP TS 22.146, entitled: *Multimedia Broadcast Multicast Service* (*MBMS*), the contents of which are hereby incorporated by reference in its entirety.

In addition to being coupled to the BS 14, the terminal 10 can be wirelessly coupled to one or more wireless access points (APs) 30. The APs can comprise access points configured to communicate in accordance with techniques such as, for example, radio frequency (RF), Bluetooth (BT), infrared (IrDA) or any of a number of different wireless networking techniques, including WLAN techniques. The APs may be coupled to the Internet 22. Like with the MSC 16, the APs can be directly coupled to the Internet. In one advantageous embodiment, however, the APs are indirectly coupled to the Internet via a WAP GTW, including a push proxy/GTW and/or method proxy/GTW. As will be appreciated, by directly or indirectly connecting the terminals and the push initiator 24, origin server 26, as well as any of a number of other devices, to the Internet, the terminals can communicate with the push initiator, origin server, etc., and with one another to thereby carry out various functions of the terminal, such as to transmit data, content or the like to, and/or receive content, data or the like from, the push initiator, origin server, etc.

Further, the terminal 10 can additionally, or alternatively, be coupled to a digital broadcaster 34 via a digital broadcast network, such as a terrestrial digital video broadcasting (e.g., DVB-T, DVB-H, ISDB-T, ATSC, etc.) network. As will be appreciated, by directly or indirectly connecting the terminals and the digital broadcaster, the terminals can receive content, such as content for one or more television, radio and/or data channels, from the digital broadcaster. In this regard, the digital broadcaster can include, or be coupled to, a transmitter (TX) 36, such as a DVB-T TX. Similarly, the terminal can include a receiver, such as a DVB-T receiver (not shown). The terminal can be capable of receiving content from any of a number of different entities in any one or more of a different number of manners. In one embodiment, for example, the terminal can comprise a terminal 10' capable of transmitting and/or receiving data, content or the like in accordance with a DVB (e.g., DVB-T, DVB-H, etc.) technique as well as a cellular (e.g., 1G, 2G, 2.5G, 3G, etc.) communication technique. In such an embodiment, the terminal 10' may include an antenna 12A for receiving content from the TX, and another antenna 12B for transmitting signals to and for receiving signals from a BS 14. For more information on such a terminal, see U.S. patent application Ser. No. 09/894,532, entitled: Receiver, filed Jun. 29, 2001, the contents of which is incorporated herein by reference in its entirety.

In addition to, or in lieu of, directly coupling the terminal 10 to the digital broadcaster 34 via the TX 36, the terminal can be coupled to a digital broadcast receiving terminal 38 which, in turn, can be coupled to the digital broadcaster 34, such as directly and/or via the TX. In such instances, the digital broadcast receiving terminal can comprise a DVB-T receiver, such as a DVB-T receiver in the form of a set top box. The terminal can be locally coupled to the digital broadcast receiving terminal, such as via a personal area network. In one advantageous embodiment, however, the terminal can additionally or alternatively be indirectly coupled to the digital broadcast receiving terminal via the Internet 22.

In accordance with a number of digital broadcasting techniques, such as DVB-T, Internet Protocol (IP) Datacast (IPDC) can be utilized to provide audio, video and/or other content to terminals 10. In this regard, the digital broadcaster 34 can be capable of providing IP datacasting content to the terminal utilizing a digital broadcasting technique. As will be appreciated by those skilled in the art, digital broadcasting techniques such as DVB-T are essentially cellular in nature with a transmission site associated with each of a number of different cells. DVB-T, for example, uses MPEG-2 transport streams, and as such, IP data can be encapsulated into DVB transmission signals sent from the digital broadcaster, or more particularly the TX 36. Data streams including IP datagrams can be supplied from several sources, and can be encapsulated by an IP encapsulator (not shown). The IP encapsulator, in turn, can feed the encapsulated IP data streams into the data broadcasting (e.g., DVB-T) network.

The encapsulated IP data streams can then be transported to one or more transmission sites, where the transmission sites form cells of the data broadcasting network. For example, the encapsulated IP data streams can be transported to one or more transmission sites on an MPEG-2 transport stream for subsequent transmission over the air directly to the terminals, or to a receiver station serving one or more terminals. As will be appreciated, the MPEG-2 transport stream, from production by the IP encapsulator, to reception by the terminals or the receiver station, is typically uni-directional in nature. In this regard, IP packets containing the data can be embedded in multi-protocol encapsulation (MPE) sections that are transported within transport stream packets.

In addition to the IP packets, the MPE sections can also include forward error correction (FEC) information and time slicing information. By including information such as time slicing information, data can be conveyed discontinuously with the receiver (e.g., terminal 10), being capable of saving battery power by switching off when no data is being transmitted to the receiver. In other terms, in accordance with one time slicing technique, instead of using the current default method of continuous digital broadcasting (e.g., DVB-T) transmission, a time division multiplex-type of allocation technique can be employed (see, e.g., DVB-H standard). With such an approach, then, services can be provided in bursts, allowing a receiver to power down when the receiver is not receiving data, and allowing the receiver to power up to receive data packets, as necessary.

Referring now to FIG. 2, a block diagram of an entity capable of operating as a terminal 10, push proxy/GTW 18, method proxy/GTW 20, push initiator 24 and/or origin server 26 is shown in accordance with one embodiment of the present invention. Although shown as separate entities, in some embodiments, one or more entities may support one or more of a terminal, push proxy/GTW, method proxy/GTW, push initiator and/or origin server, logically separated but co-located within the entit(ies). For example, a single entity may support a logically separate, but co-located, push proxy GTW with a method proxy/GTW. Also, for example, a single entity may support a logically separate, but co-located push initiator with an origin server.

As shown, the entity capable of operating as a terminal 10, push proxy/GTW 18, method proxy/GTW 20, push initiator 24 and/or origin server 26 can generally include a processor 40 connected to a memory 42 and an interface 44. The memory can comprise volatile and/or non-volatile memory, and typically includes software applications, instructions or the like for the processor to perform steps associated with operation of the entity in accordance with embodiments of the present invention. For example, as a terminal, the memory may include user or host applications such as a conventional Web browser for communicating in accordance with the hypertext transfer protocol (HTTP), a file transfer (e.g., FTP) application, a Telnet application, a peer-to-peer access application, or the like. The memory may also include a software download agent capable of facilitating the complete download of content to the terminal, as described below. Additionally, as explained below, the memory may include non-volatile memory cache 42A for storage of incomplete downloaded content, and non-volatile memory 42B for storage of content, such as complete downloaded content.

Reference is now drawn to FIG. 3, which illustrates a functional diagram of a mobile station that may operate as a terminal 10, according to embodiments of the invention. It should be understood, that the mobile station illustrated and hereinafter described is merely illustrative of one type of terminal that would benefit from the present invention and, therefore, should not be taken to limit the scope of the present invention. While several embodiments of the mobile station are illustrated and will be hereinafter described for purposes of example, other types of mobile stations, such as portable digital assistants (PDAs), pagers, laptop computers and other types of voice and text communications systems, can readily employ the present invention.

The mobile station includes a transmitter 44, a receiver 46, and a controller 48 that provides signals to and receives signals from the transmitter and receiver, respectively. These signals include signaling information in accordance with the air interface standard of the applicable cellular system, and also user speech and/or user generated data. In this regard, the mobile station can be capable of operating with one or more air interface standards, communication protocols, modulation types, and access types. More particularly, the mobile station can be capable of operating in accordance with any of a number of first-generation (1G), second-generation (2G), 2.5G and/or third-generation (3G) communication protocols or the like. For example, the mobile station may be capable of operating in accordance with 2G wireless communication protocols IS-136 (TDMA), GSM, and IS-95 (CDMA). The mobile station can additionally or alternatively be capable of operating in accordance with any of a number of different digital broadcasting techniques, such as the DVB technique (e.g., DVB-T, ETSI Standard EN 300 744). The mobile station can also be capable of operating in accordance with any of a number of different broadcast and/or multicast techniques, such as the MBMS technique (e.g., 3GPP TS 22.146). Further, the mobile station can be capable of operating in accordance with ISDB-T (Japanese Terrestrial Integrated Service Digital Broadcasting), DAB (Digital Audio Broadcasting), ATSC (Advanced Television Systems Committee) techniques or the like. Some narrow-band AMPS (NAMPS), as well as TACS, mobile terminals may also benefit from the teaching of this invention, as should dual or higher mode phones (e.g., digital/analog or TDMA/CDMA/analog phones).

It is understood that the controller 48 includes the circuitry required for implementing the audio and logic functions of the mobile station. For example, the controller may be comprised of a digital signal processor device, a microprocessor device, and various analog to digital converters, digital to analog converters, and other support circuits. The control and signal processing functions of the mobile station are allocated between these devices according to their respective capabilities. The controller thus also includes the functionality to convolutionally encode and interleave message and data prior to modulation and transmission. The controller can additionally include an internal voice coder (VC) 48A, and may include an internal data modem (DM) 48B. Further, the controller may include the functionality to operate one or more software applications, which may be stored in memory.

The mobile station also comprises a user interface including a conventional earphone or speaker 50, a ringer 52, a microphone 54, a display 56, and a user input interface, all of which are coupled to the controller 48. The user input interface, which allows the mobile station to receive data, can comprise any of a number of devices allowing the mobile station to receive data, such as a keypad 58, a touch display (not shown) or other input device. In embodiments including a keypad, the keypad includes the conventional numeric (0-9) and related keys (#, *), and other keys used for operating the mobile station.

The mobile station can also include one or more means for local communication with one or more electronic devices, such as another terminal 10, an origin server 26, an AP 32, a digital broadcast receiving terminal 38, a digital broadcaster 34 or the like, in accordance with any of a number of different wireline and/or wireless techniques. For example, the mobile station can include a radio frequency (RF) transceiver 60 and/or an infrared (IR) transceiver 62 such that the mobile station can locally communicate in accordance with radio frequency and/or infrared techniques. Also, for example, the mobile station can include a Bluetooth (BT) transceiver 64 such that the mobile station can locally communicate in accordance with Bluetooth transfer techniques. Although not shown, the mobile station may additionally or alternatively be capable of transmitting and/or receiving data from electronic devices according to a number of different wireline and/or wireless networking techniques, including LAN and/or WLAN techniques. In this regard, as shown in FIG. 1 with respect to terminal 10', the mobile station may include an additional antenna or the like to transmit and/or receive data from such electronic devices (e.g., digital broadcaster).

The mobile station can further include memory, such as a subscriber identity module (SIM) 66, a removable user identity module (R-UIM) or the like, which typically stores information elements related to a mobile subscriber. In addition to the SIM, the mobile station can include other memory. In this regard, the mobile station can include volatile memory 68, such as volatile Random Access Memory (RAM) including a cache area for the temporary storage of data. The mobile station can also include other non-volatile memory 70, which can be embedded and/or may be removable. The non-volatile memory can additionally or alternatively comprise an EEPROM, flash memory, hard disk or the like. The memories can store any of a number of pieces of information, and data, used by the mobile station to implement the functions of the mobile station. For example, the memories may include user or host applications such as a conventional Web browser for communicating in accordance with the hypertext transfer protocol (HTTP), a file transfer (e.g., FTP) application, a Telnet application, a peer-to-peer access application, or the like. The memory may also include a software download agent capable of facilitating the complete download of content to the terminal, as described below. Additionally, as explained below, the non-volatile memory may include a cache (not shown) for storage of incomplete downloaded content. Further, non-volatile memory may include a portion for storage of other content, such as complete downloaded content.

In accordance with embodiments of the present invention, the system is capable of operating in accordance with one or more push technologies. As explained above in the background section, conventional push technologies, such as that provided by the WAP push architecture, require client (or user of the client) interaction to effectuate the download of content from the push initiator to the client (i.e., end-user needs to accept the pushed content before the content delivery). And whereas conventional service loading technologies are capable of pushing content without end-user interaction, conventional service loading technologies are prone to spamming with respect to subscribed/non-subscribed push type services (e.g., e-mail). Embodiments of the present invention are therefore capable of pushing content to a terminal 10 without end-user interaction, while reducing the likelihood of the terminal receiving unsolicited content. As used herein, content can refer to any of a number of different content, services or the like capable of being pushed or provided to, or otherwise received by, the terminal.

More particularly, the terminal 10 of embodiments of the present invention is capable of authenticating one or more of a push initiator 24, origin server 26 and content pushed to the terminal from the origin server, such as in accordance with a token-based authentication technique. Advantageously, the terminal can be capable of authenticating the push initiator, origin server and/or content before the content is pushed to the terminal, typically from an origin server in accordance with a service loading technique. Thereafter, if the terminal has authenticated the push initiator, origin server and/or content, the terminal is capable of receiving the pushed content. If the terminal fails to authenticate the push initiator, origin server and/or content, however, the terminal can be capable of refusing to receive the pushed content. By requiring the terminal to authenticate the push initiator, origin server and/or content, and by pushing content to the terminal in accordance with a service loading technique when the terminal has authenticated the push initiator, origin server and/or content, the terminal is capable of receiving pushed content without end-user interaction, and while reducing the likelihood of the terminal receiving unsolicited (i.e., unauthorized) content.

Reference is now made to FIG. 4, which illustrates a control flow diagram of various elements of the system performing a method of downloading pushed content to a terminal 10, in accordance with one embodiment of the present invention. As shown and described, the method includes authorizing a push initiator 24. It should be understood, however, that the method can additionally or alternatively include authenticating an origin server 26 providing content to the terminal and/or the provided content, without departing from the spirit and scope of the present invention. Also, as shown and described, the method includes authorizing the push initiator in accordance with a token-based authentication technique. It should also be understood, however, that the method can authenticate the push initiator (origin server, and/or provided content) in accordance with any of a number of different authentication techniques, such as any of a number of different public or private key cryptography techniques, without departing from the spirit and scope of the present invention.

As shown in FIG. 4, a method of downloading pushed content to a terminal 10 includes the terminal sending a subscription request to a push initiator 24 to receive an authentication token or certificate, otherwise referred to as a public key. The subscription request can include any of a number of different pieces of information appropriate to request such a public key. In one embodiment, however, the subscription request includes an indication that the terminal desires to authenticate the push initiator such that the terminal receives pushed content initiated by the push initiator. In addition to such an indication, the subscription request can identify one or more origin servers 26 and/or content that the terminal desires to further authenticate prior to receipt of pushed content.

Upon receipt of the subscription request, the push initiator 24 can respond by sending a public key to the terminal 10, where the public key is associated with the subscription request. The terminal can then store the public key, such as in memory 42, where the public key can be stored along with an association to the subscription request (such as in instances in which the terminal authorizes more than one push initiator). As will be appreciated by those skilled in the art, in addition to being associated with the subscription request (at the push initiator and/or terminal) the public key also has an associated private key. In this regard, the push initiator maintains the private key in a private manner, but makes the public key (non-secret key) available to the terminal. As explained below, the push initiator can utilize the private key to digitally sign data transmitted to the terminal. The terminal can thereafter verify such data as originating from the authenticated push initiator based upon the digital signature and the public key.

At any point after the push initiator 24 sends the public key to the terminal 10, the push initiator can communicate with the terminal in accordance with a service loading architecture, such as the WAP service loading architecture, to thereby initiate content delivery to the terminal. In this regard, the push initiator can be capable of sending service loading content to a push proxy/GTW 18, such as in accordance with the Push Access Protocol (PAP), and instructing the push proxy/GTW to transmit the service loading content to the terminal 10. Before the push initiator sends the service loading content to the push proxy/GTW, however, the push initiator utilizes the private key to digitally sign the service loading content, such as in accordance with any technique known to those skilled in the art. In addition to the digital signature, then, the service loading content typically includes a uniform resource identifier (URI) of content to be received by the terminal.

As will be appreciated, in various instances, the push initiator 24, or another device, server or the like capable of controlling the push initiator, may maintain a restricted listing including one or more authorized origin servers 26 and/or authorized content, and/or one or more blocked origin servers and/or blocked content, for the terminal 10. In such instances, before the push initiator sends the service loading content to the push proxy/GTW 18, and before the push initiator digitally signs the service loading content, the restricted listing can be checked, such as by the push initiator or other device, server or the like maintaining the restricted listing to insure that the origin server and/or the content is authorized, and/or that the origin server and/or the content is not blocked. By checking the restricted listing, the push initiator can send the service loading content to the terminal if the service loading content, or more particularly the origin server and content identified by the service loading content, satisfies the restricted listing.

After the push initiator sends the digitally signed service loading content, the terminal 10 can pull the content identified by the URI upon receipt of the digitally signed service loading content, and without user interaction. Before pulling the content, however, the terminal can, again without user interaction, automatically authenticate the service loading content by verifying the digital signature with the service loading content. In this regard, the terminal can use the public key sent by the push initiator to verify the digital signature. By verifying the digital signature, the terminal can verify that the service loading content originated at an authorized push initiator 24, and can verify that the service loading content identifies authorized content at an authorized origin server 26, if such were designated in the subscription request.

If the terminal fails to authenticate the service loading content, such as by failing to verify the digital signature with the service loading content, the terminal 10 can respond in any of a number of different manners. For example, the terminal can cease communication with the push proxy/GTW 18. Additionally, or alternatively, the terminal can notify the push initiator 24, push proxy/GTW and/or the user of the terminal that the terminal failed to verify received service loading content, and if so desired, that the failure may be due to spamming of the terminal.

If the terminal 10 successfully authenticates the service loading content by verifying the digital signature with the service loading content, the terminal can pull or otherwise download the content identified in the service loading content. In this regard, the terminal can communicate with the method proxy/GTW 20, such as in accordance with the Wireless Session Protocol (WSP). More particularly the terminal can instruct the method proxy/GTW to request the content identified by the URI from the origin server 26 (also identified by the URI) associated with or otherwise controlling access to the identified content. In turn, the method proxy/GTW can communicate with the origin server, such as in accordance with the Hypertext Transfer Protocol (HTTP), to request the identified content. Upon receipt of the request for the identified content, the origin server can respond by sending the identified content to the method proxy/GTW, such as in accordance with the Wireless Markup Language (WML). The method proxy/GTW can then forward the identified content to the terminal.

As explained in the background section, if the terminal 10 is downloading large content, such as from the origin server 26 (via the method proxy/GTW 20) the time to download the content typically increases, thus increasing the probability that the terminal will encounter some type of error or interruption in transmission during the download process. Conventionally, when content is downloaded in a single download session, if an error or interruption in transmission occurs during the download process, the terminal must restart the download process to completely download the content. Thus, embodiments of the present invention may be capable of not only pushing content to a client without end-user interaction and while reducing the likelihood of receiving unsolicited services or content, but also be capable of recovering a download session that has encountered a terminal error, as well as a network error.

As described herein, the system can be capable of recovering a download session between an origin server 26 and the terminal 10 via the method proxy/GTW 20. It should be understood, however, that the system can be capable of recovering a download session between the terminal and any other device, server or the like capable of communicating with the terminal, without departing from the spirit and scope of the present invention. For example, the system can be capable of recovering a download session between the terminal and an origin server, download server, digital broadcaster 34 (see FIG. 1) or the like. It should also be understood that the system can be capable of recovering a download session between the terminal and any other device, where the downloaded content comprises any one or more of point-to-point, unicast, multicast and broadcast content.

Reference is now drawn to FIG. 5, which illustrates a functional block diagram of a terminal 10 downloading content from an origin server 26, in accordance with one advantageous embodiment of the present invention. As shown, the terminal is capable of operating an application 72, such as a conventional Web browser, which is capable of receiving content 74, such as in accordance with HTTP. The terminal is also capable of operating a download agent 76, which is capable of delivering content to the application. In this regard, the download agent is typically capable of accessing content storage 78 (e.g., FIG. 3, storage 42B) and an incomplete download content storage 80 (e.g., FIG. 3, cache 42A), where the incomplete download content storage of one advantageous embodiment comprises non-volatile memory.

As explained in further detail below, in accordance with one embodiment of the present invention, a modified Open Mobile Alliance (OMA) download Over-The-Air (OTA) session is utilized employed for download recovery. For more information on the OMA OTA architecture, see Open Mobile Alliance, *Generic Content Download Over the Air*, OMA-Download-OTA-v1_0-20030221-C, the contents of which are incorporated herein by reference in its entirety.

With reference to the control flow diagram of FIG. 6, a method of download recovery in accordance with one embodiment of the present invention generally includes the terminal 10 accessing the origin server 26, such as via the method proxy/GTW 20, to download content 74 from the origin server. If so desired, as the terminal accesses the origin server, the terminal can be authenticated to the origin server, such as in accordance with any of a number of different manners. Also, as the terminal accesses the origin server, the terminal can access content associated with or otherwise controlled by the origin server using an application 72 to download content, and identify the content to be downloaded.

To download content 74 from the origin server 26, the application 72 can send a request for the content to the download agent 76, such as by sending a GetContent message to the download agent. In turn, the download agent can send the request for content (e.g., the GetContent message) to the origin server. Upon receipt of the content request, the origin server can send a download descriptor 82 to the terminal 10. The download agent can receive the download descriptor, and thereafter store the download descriptor in the incomplete download storage 80. The download descriptor can include any of a number of different pieces of information to facilitate the terminal in downloading the requested content, but in one embodiment, the download descriptor includes attributes such as size of the requested content and a uniform resource identifier (URI) of a location from which to retrieve the content. Additionally, the download descriptor can include information regarding a preferred time, place and technology for use in downloading the requested content.

After receiving the download descriptor 82, the download agent 76 can instruct the origin server 26 to thereby retrieve the requested content 74, such as by sending a GetMediaObject instruction to the URI specified in the download descriptor 82. Upon receipt of the instruction from the download agent, the origin server can send the requested content to the terminal 10, or more particularly to the download agent. In this regard, the content can be sent from the origin server to the download agent in a number of content data packets $74_1$, $74_2, \ldots 74_n$. The download agent can then store each packet in the incomplete download storage 80 as the download agent receives each packet. As will be appreciated, the origin server can send the content to the download agent across a uni-directional or bi-directional network. And as will also be appreciated, the origin server can send the content independent of the terminal requesting, receiving or using a public key, such as in a manner described above with respect to FIG. 4.

During the download session, between groups or blocks 84 of one or more packets, an information packet can be added to the packet stream, as shown in FIG. 7. In this regard, download agent 76 can receive and thereafter store each information packet, such as in the incomplete download storage 80, to facilitate download recovery. Each information packet can generally include information as to the number of packets in a block of packets the download agent is expected to receive before a subsequent information packet or other information relating to the packets, such as a sequence of one or more cyclic redundancy codes (CRC's). Alternatively, each information packet can include information as to the number of packets in the block of packets the download agent should have received after a previous information packet or other information relating to the packets. In addition to information regarding a number of packets in the block of packets before or after the information packet, each information packet can include information (e.g., sequence of packet CRC's) uniquely describing the packets before or after the information packet, as well as one or more identifiers identifying the terminal 10, the information packet, requested content and/or the download session.

In accordance with various protocols, such as the User Datagram Protocol (UDP), packets may arrive at the download agent 76 in an order different from the order the origin server 26 transmitted the packets. Conventionally, however, packets in accordance with protocols such as UDP do not include information relating to the sequence of the packets or the total number of data packets comprise the requested content. Thus, in addition to the number of packets in a block of packets before or after an information packet, each information packet can include an identifier that identifies placement of the respective data packet in relation to the other data packets of the content. Alternatively, each information packet can include a table uniquely identifying the block of packets before or after the respective information packet, each of the packets referenced by the respective information packet, and the correct order of the packets. For example, each information packet can include a table including the CRC's or other uniquely describing data fields of the packets in the block of packets before or after the respective information packet. By directly or indirectly identifying the order of the data packets, the download agent can subsequently order the packets in the same order that the origin server transmitted the packets.

As will be appreciated, the blocks of packet(s) can each include the same number of packets, or the number of packets in each block of packet(s) can vary from block to block. As will also be appreciated, in instances in which the blocks of packet(s) include the same number of packets, an information packet may, but need not, be sent only once at the beginning of the download session. In addition, although the origin server 26 can include information packets between blocks of data packet(s), the information otherwise included in the information packets can alternatively be added to one or more of the data packets. Further, as explained above, download agent 76 can receive and thereafter store each information packet to facilitate download recovery. However, the download agent, need not maintain all of the received information packets in storage. For example, the download agent can be configured to store only one or more of the latest received information packets.

During the download session, then, the download agent 76 can utilize the information packets to monitor the received data packets. More particularly, the download agent can monitor the received data packets to track the number and accuracy of the received packets, blocks of packet(s) or portion of the requested content. In this regard, the number of received packets, blocks of packet(s) or portion of the requested content can be compared to an identified number of packets of the requested content at any one or more points during the download session. The accuracy of the received packets, blocks of packet(s) or portion of the requested content can be verified in any of a number of different manners, such as by utilizing CRC data in each of the packets. Similarly, a CRC or any other characteristic of accuracy can be included in each transmitted packet, block of packet(s) or portion of the requested content.

By tracking the number and accuracy of the received packets, the download agent 76 can identify if, and when, a download session has experienced an interruption. In this regard, an interruption in the download session can be identified in any of a number of different manners. For example, the download session can be regarded as interrupted if the total number of received packets, blocks of packet(s) or portion of the requested content, which can generally be identified by the download descriptor 82 and/or one or more information packets, does not equal the total number of received packets, blocks of packet(s) or size of the requested content when the download session ends or is terminated. Also, the downloaded session can be regarded as interrupted if the number of erroneously received packets exceeds a predetermined number of packets when the download session ends or is terminated, where the predetermined number of packets can be dependent on the type of the downloaded content (absolute number or relative) when the download session ends. In addition, the download session can be regarded as interrupted if a user of the terminal 10 terminates the download session, or if the download session is terminated by the terminal (e.g. due to power failure).

Presume that an interruption occurs during download of the requested content 74, such as during transmission of a third packet. Following the interruption, the terminal 10, or more particularly the download agent 76, can re-establish communication with the origin server 26, and again be authenticated, if so desired. In this regard, the interruption can be signaled to the origin server. If the interruption is due to power failure or due to any other instance in which the terminal cannot re-establish communication with the origin server, however, data that can facilitate recovery of the download session, such as one or more information packets and/or the download descriptor 82, can remain in the incomplete download storage 80 such that communication can be re-established at a subsequent time when the terminal is capable of re-establishing communication and the user of the terminal desires to recover the download.

After interruption of the download, such as after re-establishing communication with the origin server, the download agent can retrieve the download descriptor 82 and one or more information packets from the incomplete download storage 80. From the download descriptor and a list of the complete packets stored in the incomplete download storage, which can be determined directly or from the information packet(s), it can be established the packets that need to be downloaded to complete the download of the requested content. In this regard, the application 72 can request a list of the complete packets stored in the incomplete download storage, such as by sending a GetInterruptedDL( ) message to the download agent. And upon receipt of the request from the application, the download agent can send a list of the complete packets to the application.

After determining how much of the download has been completed, the download agent 76 can be instructed to recover the interrupted packet, as well as the remaining packets to be sent to the terminal 10 to complete the download of the content. In this regard, the application can send an instruction, such as a resume download message, to the download agent to thereby instruct the download agent to recover the interrupted packet and download the remaining packets. In turn, the download agent can send an instruction, such as a resume download message, to the origin server. In this regard, the instruction can specify a session identifier identifying a download session to the origin server, an object identifier identifying the requested content, and/or a pointer to the interrupted packet. The instruction can also include an identifier identifying the terminal, and/or a description of a cause for the interruption.

Upon receipt of the instruction from the terminal 10, or more particularly the download agent 76, the origin server can send the interrupted packet, as well as the remaining packets of the requested content 74, to the download agent. As before, upon receipt of the packets, the download agent can store the packets in the incomplete download storage 80. Then, after the download agent has received all of the packets of the requested content, the download agent can, but need not, send a message to the origin server to indicate that the download has been successfully completed. The download agent can also transfer the requested content from the incomplete download storage to the content storage 78, and notify the application 72 that the content has been successfully downloaded. Thereafter, the application can utilize the content, as desired, and can notify a user of the terminal that the content download has been completed.

According to one aspect of the present invention, all or a portion of the system of the present invention, such as all or portions of the terminal 10, push initiator 24, and/or origin server 26, generally operates under control of a computer program product (e.g., download agent 76). The computer program product for performing the methods of embodiments of the present invention includes a computer-readable storage medium, such as the non-volatile storage medium, and computer-readable program code portions, such as a series of computer instructions, embodied in the computer-readable storage medium.

In this regard, FIGS. 4 and 6 are control flow diagrams of methods, systems and program products according to the invention. It will be understood that each block or step of the control flow diagrams, and combinations of blocks in the control flow diagrams, can be implemented by computer program instructions. These computer program instructions may be loaded onto a computer or other programmable apparatus to produce a machine, such that the instructions which execute on the computer or other programmable apparatus create means for implementing the functions specified in the control flow diagrams block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the control flow diagrams block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the control flow diagrams block(s) or step(s).

Accordingly, blocks or steps of the control flow diagrams support combinations of means for performing the specified functions, combinations of steps for performing the specified functions and program instruction means for performing the specified functions. It will also be understood that each block or step of the control flow diagrams, and combinations of blocks or steps in the control flow diagrams, can be implemented by special purpose hardware-based computer systems which perform the specified functions or steps, or combinations of special purpose hardware and computer instructions.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system comprising:
    a terminal comprising a processor configured to receive service loading content that identifies download content and has a digital signature, wherein the processor is configured to authenticate the service loading content based upon the digital signature, and when the service loading content is authenticated, pull the download content to the terminal, wherein the processor is configured to authenticate the service loading content, and pull the download content, in response to receiving the service loading content and independent of interaction from a user of the terminal, and wherein the processor is configured to determine when an interruption occurs in pulling the download content such that the terminal receives a portion but less than all of the download content, and when an interruption occurs in receiving the content, recover the download content including receiving a remaining portion of the download content without also receiving at least part of the previously received portion; and
    an origin server associated with the download content, wherein the service loading content identifies the origin server associated with the download content, wherein the processor of the terminal is configured to send a request for the download content to the origin server when the service loading content is authenticated, and wherein the processor is configured to receive the download content from the origin server in response to the request.

2. The system according to claim 1, wherein the processor of the terminal is configured to verify the digital signature with a public key to thereby authenticate the service loading content.

3. The system according to claim 2 further comprising:
a push initiator configured to digitally sign the service loading content with a private key associated with the public key, and thereafter transmit the service loading content to the terminal.

4. The system according to claim 1, wherein the processor of the terminal is configured to operate a download agent, wherein the download agent is configured to receive a download descriptor, and thereafter receive the download content.

5. The system according to claim 4, wherein the download content comprises a plurality of data packets, and wherein the download agent is configured to determine when an interruption occurs in receiving the plurality of data packets such that the download agent receives less than the plurality of data packets of the download content, and when an interruption occurs in receiving the plurality of data packets, recover the download content such that the download agent receives the plurality of data packets.

6. The system according to claim 5, wherein the download agent is further configured to determine at least one remaining data packet to be received by the download agent to thereby complete reception of the plurality of data packets of the download content, instruct the origin server to send the at least one remaining data packet, and receive the at least one remaining data packet such that the download agent receives the plurality of data packets.

7. The system according to claim 1, wherein the download content comprises a plurality of data packets, and wherein the processor of the terminal is configured to operate a download agent configured to receive the plurality of data packets and receive at least one information packet regarding at least one group of at least one data packet.

8. The system according to claim 7, wherein the download agent is configured to monitor the received data packets to determine, based upon at least one information packet, when an interruption occurs in receiving the plurality of data packets such that the download agent receives less than the plurality of data packets of the download content, and wherein the download agent is configured to recover the download content such that the download agent receives the plurality of data packets when an interruption occurs in receiving the plurality of data packets.

9. A method comprising:
directing receipt of service loading content at a terminal, wherein the service loading content identifies download content and has a digital signature;
authenticating the service loading content based upon the digital signature; and
directing pulling of the download content to the terminal when the service loading content is authenticated, wherein the service loading content is authenticated, and the download content is pulled, in response to receipt of the service loading content and independent of interaction from a user of the terminal,
wherein directing pulling of the download content includes determining when an interruption occurs in pulling the download content such that the terminal receives a portion but less than all of the content, and when an interruption occurs in receipt of the content, directing recovery of the download content including directing receipt of a remaining portion of the download content without also directing receipt of at least part of the previously received portion, wherein the service loading content identifies an origin server associated with the download content, and wherein directing pulling of the download content comprises:
directing sending of a request for the download content to the origin server when the service loading content is authenticated; and
directing receipt of the download content at the terminal from the origin server in response to the request.

10. The method according to claim 9, wherein authenticating the service loading content comprises verifying the digital signature with a public key.

11. The method according to claim 10, wherein directing receipt of service loading content comprises directing receipt of digitally-signed service loading content, the service loading content having been digitally signed with a private key associated with the public key.

12. The method according to claim 9, wherein directing receipt of the download content comprises directing receipt of a download descriptor, and thereafter the download content.

13. The method according to claim 12, wherein the download content comprises a plurality of data packets, wherein determining when an interruption occurs comprises determining when an interruption occurs in receipt of the plurality of data packets such that the terminal receives less than the plurality of data packets of the download content, and wherein directing recovery of the download content comprises directing recovery of the download content such that the terminal receives the plurality of data packets.

14. The method according to claim 13, wherein directing recovery of the download content comprises:
determining at least one remaining data packet to be received at the terminal to thereby complete reception of the plurality of data packets of the download content;
instructing the origin server to send the at least one remaining data packet; and
directing receipt of the at least one remaining data packet such that the terminal receives the plurality of data packets.

15. The method according to claim 9, wherein the download content comprises a plurality of data packets, and wherein directing receipt of the download content comprises directing receipt of the plurality of data packets and at least one information packet regarding at least one group of at least one data packet.

16. The method according to claim 15, wherein directing receipt of the plurality of data packets further comprises:
monitoring the received data packets to determine, based upon at least one information packet, when an interruption occurs in receipt of the plurality of data packets such that the terminal receives less than the plurality of data packets of the download content; and when an interruption occurs in receipt of the plurality of data packets,
directing recovery of the download content such that the terminal receives the plurality of data packets.

17. A computer program product comprising at least one computer-readable storage medium having computer-readable program code portions stored therein that in response to execution by a processor cause an apparatus to at least perform the following:
directing receipt of service loading content, wherein the service loading content identifies download content and has a digital signature;
authenticating the service loading content based upon the digital signature; and
directing pulling of the download content when the service loading content is authenticated, wherein the service loading content is authenticated, and the download content is pulled, in response to receipt of the service loading content and independent of interaction from a user of the apparatus, wherein directing pulling of the download content includes determining when an interruption occurs in pulling the download content such that the apparatus receives a portion but less than all of the content, and when an interruption occurs in receipt of the content, directing recovery of the download content including directing receipt of a remaining portion of the download content without also directing receipt of at least part of the previously received portion, wherein the service loading content identifies an origin server associated with the download content, and wherein directing pulling of the download content comprises:

directing sending of a request for the download content to the origin server when the service loading content is authenticated; and directing receipt of the download content at the apparatus from the origin server in response to the request.

18. The computer program product according to claim 17, wherein authenticating the service loading content comprises verifying the digital signature with a public key to thereby to authenticate the service loading content.

19. The computer program product according to claim 18, wherein directing receipt of service loading content comprises directing receipt of digitally-signed service loading content, the service loading content having been digitally signed with a private key associated with the public key.

20. The computer program product according to claim 17, wherein directing receipt of the download content comprises directing receipt of a download descriptor, and thereafter the download content.

21. The computer program product according to claim 20, wherein the download content comprises a plurality of data packets, wherein determining when an interruption occurs comprises determining when an interruption occurs in receipt of the plurality of data packets such that the apparatus receives less than the plurality of data packets of the download content, and wherein directing recovery of the download content comprises directing recovery of the download content such that the apparatus receives the plurality of data packets.

22. The computer program product according to claim 21, wherein directing recovery of the download content comprises:

determining at least one remaining data packet to be received at the apparatus to thereby complete reception of the plurality of data packets of the download content;

instructing the origin server to send the at least one remaining data packet; and directing receipt of the at least one remaining data packet such that the apparatus receives the plurality of data packets.

23. The computer program product according to claim 17, wherein the download content comprises a plurality of data packets, and wherein directing receipt of the download content comprises directing receipt of the plurality of data packets and at least one information packet regarding at least one group of at least one data packet.

24. The computer program product according to claim 23, wherein directing receipt of the plurality of data packets further comprises:

monitoring the received data packets to determine, based upon at least one information packet, when an interruption occurs in receipt of the plurality of data packets such that the apparatus receives less than the plurality of data packets of the download content; and when an interruption occurs in receipt of the plurality of data packets, directing recovery of the download content such that the apparatus receives the plurality of data packets.

25. An apparatus comprising:
a processor; and
a memory storing executable instructions that in response to execution by the processor cause the apparatus to at least perform the following:

directing receipt of service loading content, wherein the service loading content identifies download content and has a digital signature;

authenticating the service loading content based upon the digital signature; and directing pulling of the download content when the service loading content is authenticated, wherein the service loading content is authenticated, and the download content is pulled, in response to receipt of the service loading content and independent of interaction from a user of the apparatus, wherein directing pulling of the download content includes determining when an interruption occurs in pulling the download content such that the apparatus receives a portion but less than all of the content, and when an interruption occurs in receipt of the content, directing recovery of the download content including directing receipt of a remaining portion of the download content without also directing receipt of at least part of the previously received portion, wherein the service loading content identifies an origin server associated with the download content, and wherein directing pulling of the download content comprises:

directing sending of a request for the download content to the origin server when the service loading content is authenticated; and directing receipt of the download content at the apparatus from the origin server in response to the request.

26. The apparatus according to claim 25, wherein authenticating the service loading content comprises verifying the digital signature with a public key.

27. The apparatus according to claim 26, wherein directing receipt of service loading content comprises directing receipt of digitally-signed service loading content, the service loading content having been digitally signed with a private key associated with the public key.

28. The apparatus according to claim 25, wherein directing receipt of the download content comprises directing receipt of a download descriptor, and thereafter the download content.

29. The apparatus according to claim 28, wherein the download content comprises a plurality of data packets, wherein determining when an interruption occurs comprises determining when an interruption occurs in receipt of the plurality of data packets such that the apparatus receives less than the plurality of data packets of the download content, and wherein directing recovery of the download content comprises directing recovery of the download content such that the apparatus receives the plurality of data packets.

30. The apparatus according to claim 29, wherein directing recovery of the download content comprises:

determining at least one remaining data packet to be received at the apparatus to thereby complete reception of the plurality of data packets of the download content;

instructing the origin sever to send the at least one remaining data packet; and directing receipt of the at least one remaining data packet such that the apparatus receives the plurality of data packets.

31. The apparatus according to claim 25, wherein the download content comprises a plurality of data packets, and wherein directing receipt of the download content comprises directing receipt of the plurality of data packets and at least one information packet regarding at least one group of at least one data packet.

32. The apparatus according to claim 31, wherein directing receipt of the plurality of data packets further comprises:

monitoring the received data packets to determine, based upon at least one information packet, when an interruption occurs in receipt of the plurality of data packets such that the apparatus receives less than the plurality of data packets of the download content; and when an interruption occurs in receipt of the plurality of data packets, directing recovery of the download content such that the apparatus receives the plurality of data packets.

\* \* \* \* \*